Figure 1:
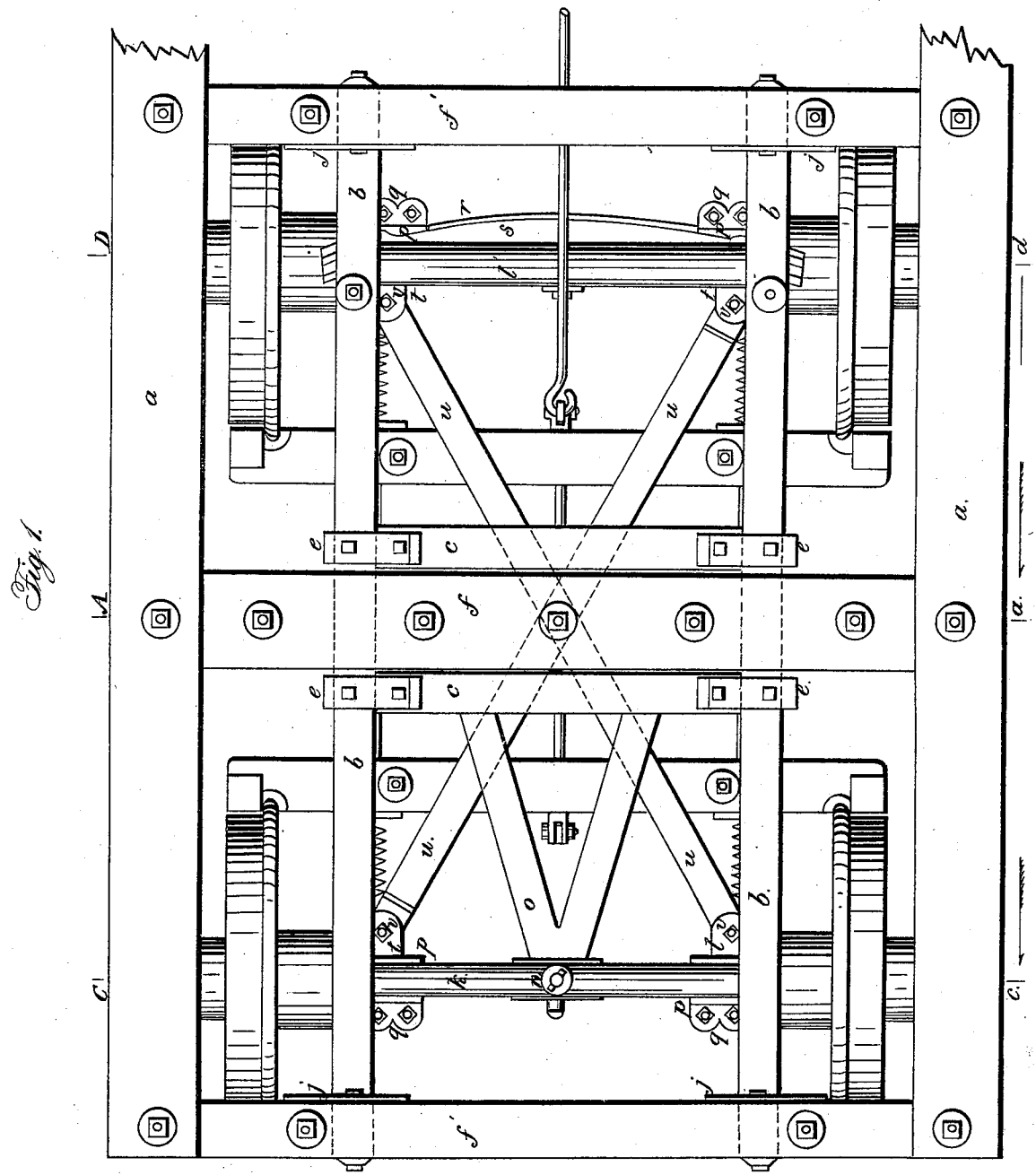

W. YOUMANS.
Car Truck.

No. 70,492.

8 Sheets—Sheet 1.

Patented Nov. 5, 1867.

Witnesses:
A. DeLacy.
Wm H Bishop

Inventor:
W Youmans
by his attorney
Wm J Kelley

W. YOUMANS.
Car Truck.
No. 70,492.
8 Sheets—Sheet 2.
Patented Nov. 5, 1867.
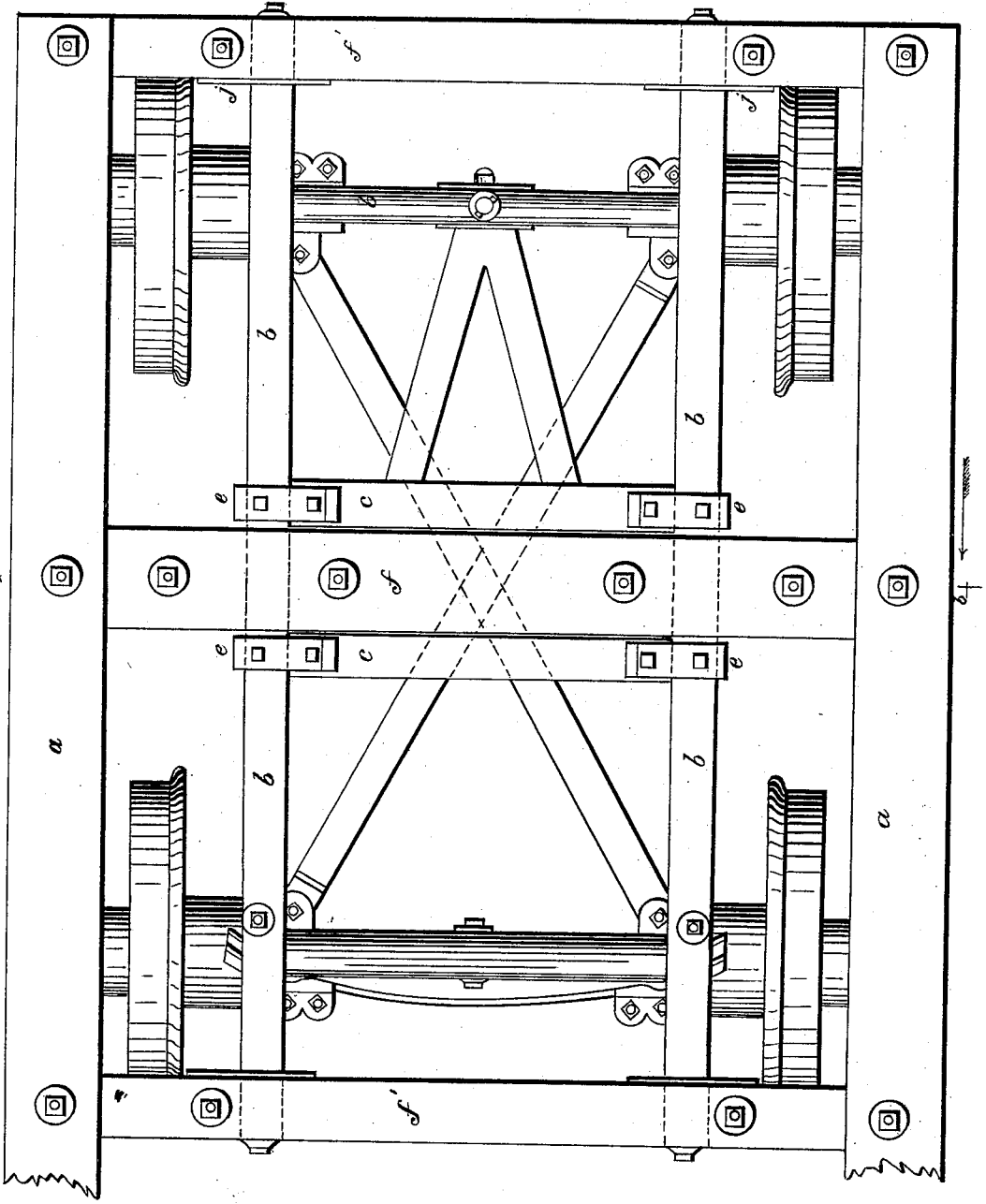
Witnesses:
A. De Lacy
Wm H Bishop
Inventor:
W. Youmans
by his attorney
Wm W Kelley W. YOUMANS.
Car Truck.
No. 70,492.
8 Sheets—Sheet 3.
Patented Nov. 5, 1867.
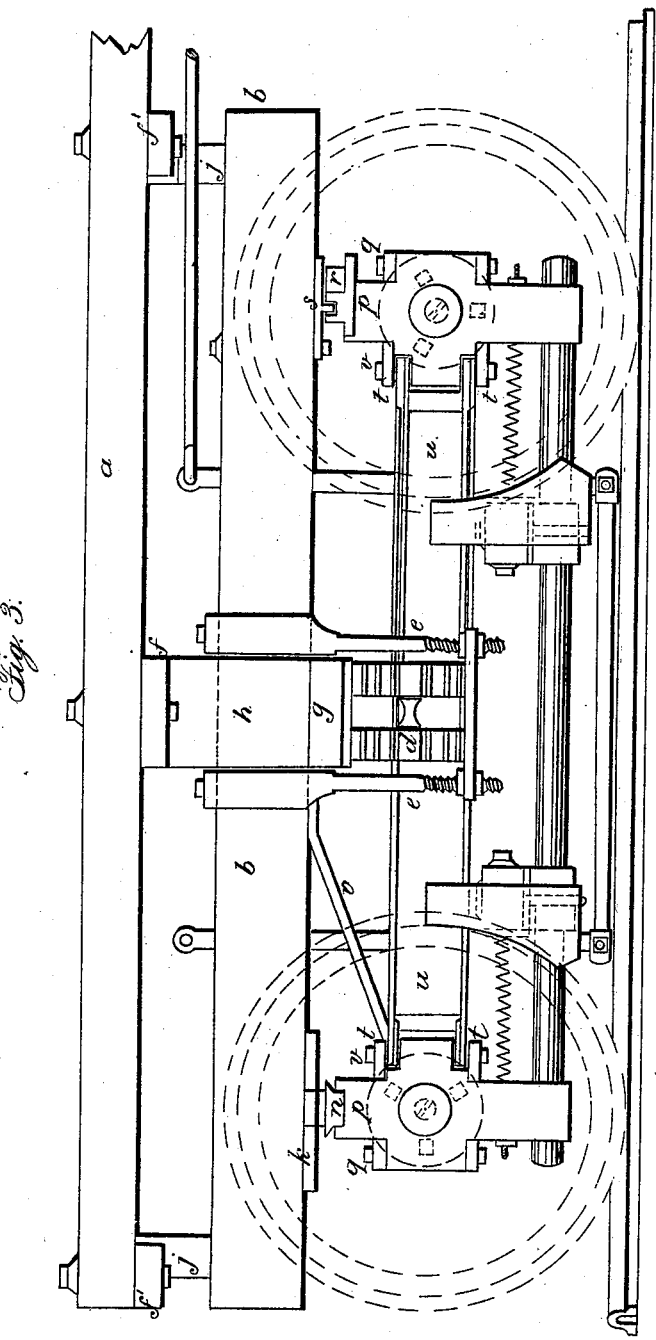
Witnesses:
A. De Lacy
Wm H. Bishop
Inventor:
W. Youmans
by his attorney
C. M. M. Kelley W. YOUMANS.
Car Truck.
No. 70,492.
8 Sheets—Sheet 4.
Patented Nov. 5, 1867.
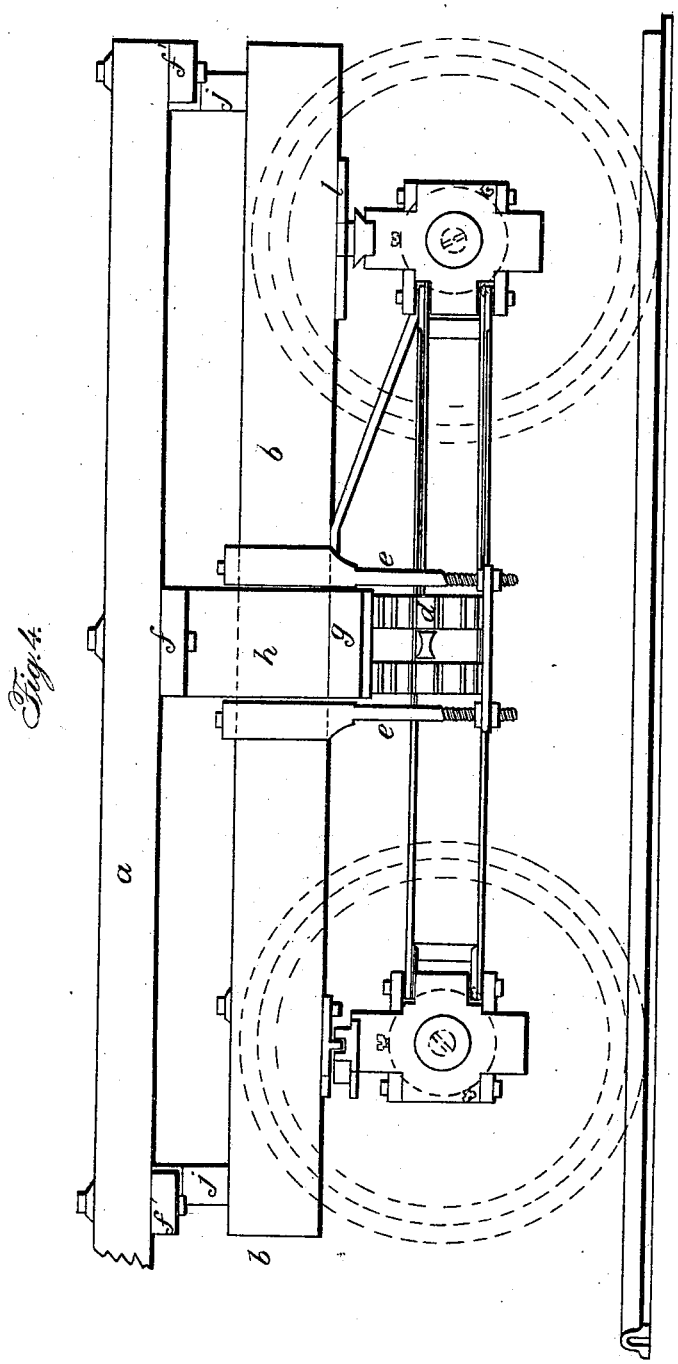
Witnesses:
A. DeLacy
Wm H Bishop
Inventor:
W. Youmans
by his Attorney
W. N. Kelley W. YOUMANS.
Car Truck.
No. 70,492.
8 Sheets—Sheet 5.
Patented Nov. 5, 1867.
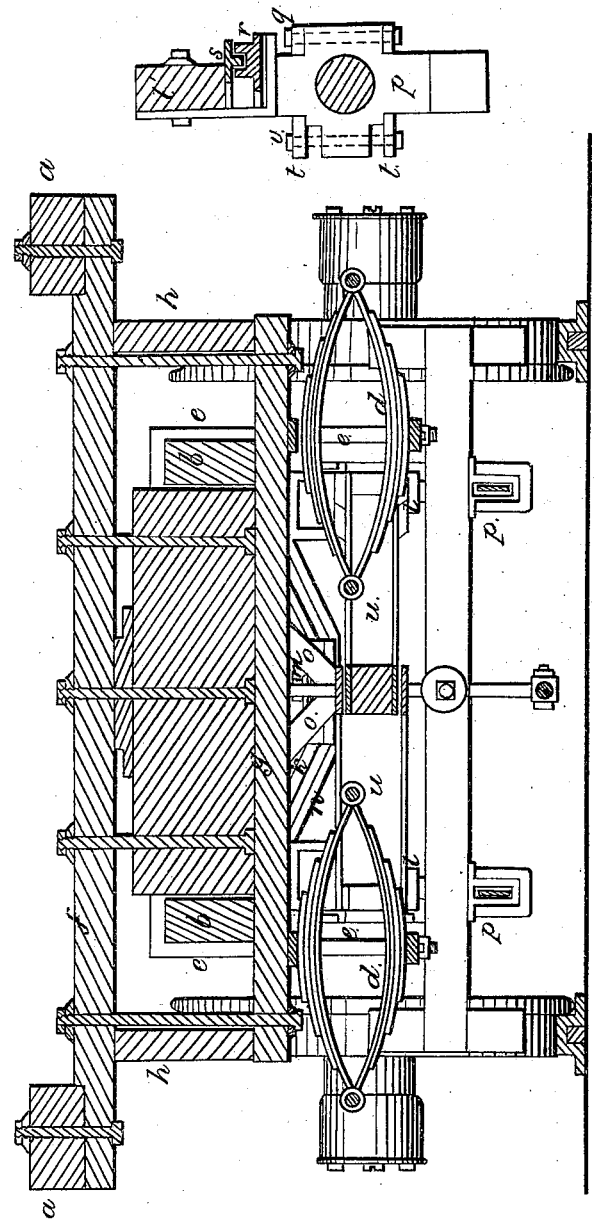
Witnesses:
A. De Lacy
W. H. Bishop
Inventor:
W. Youmans
by his attorney
W. W. Kelley W. YOUMANS.
Car Truck.
No. 70,492.
8 Sheets—Sheet 6.
Patented Nov. 5, 1867.
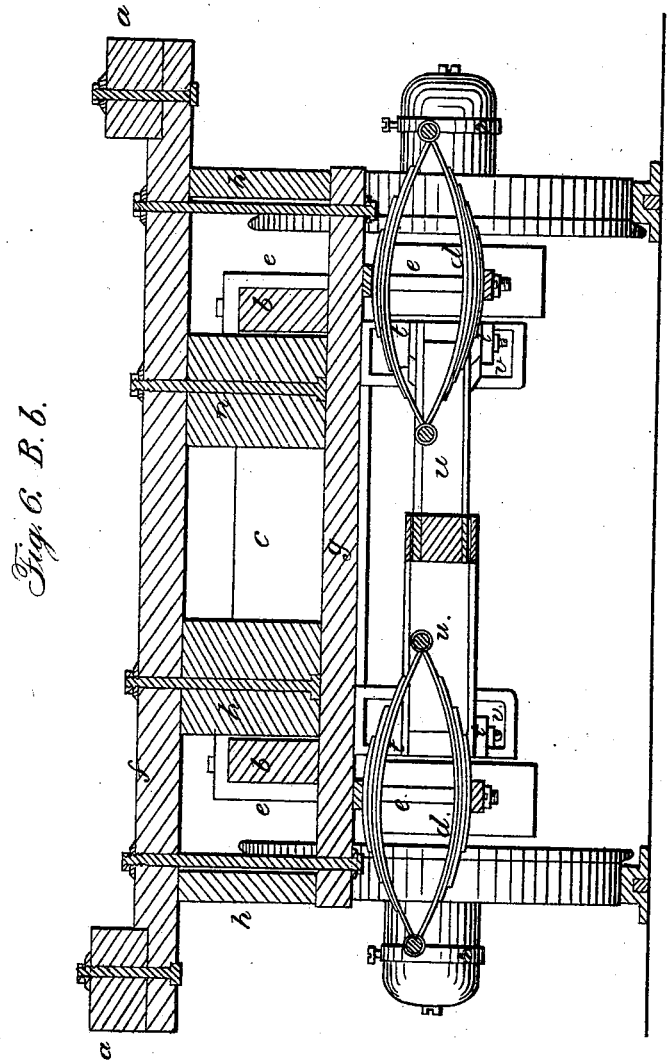
Fig. 6. B. b.
Witnesses:
A. DeLacy
Wm H Bishop
Inventor:
W. Youmans.
by his attorney
CW W Kelley
AM. PHOTO-LITHO. CO. N.Y. (OSBORNE'S PROCESS.)

W. YOUMANS.
Car Truck.
No. 70,492.
8 Sheets—Sheet 7.
Patented Nov. 5, 1867.
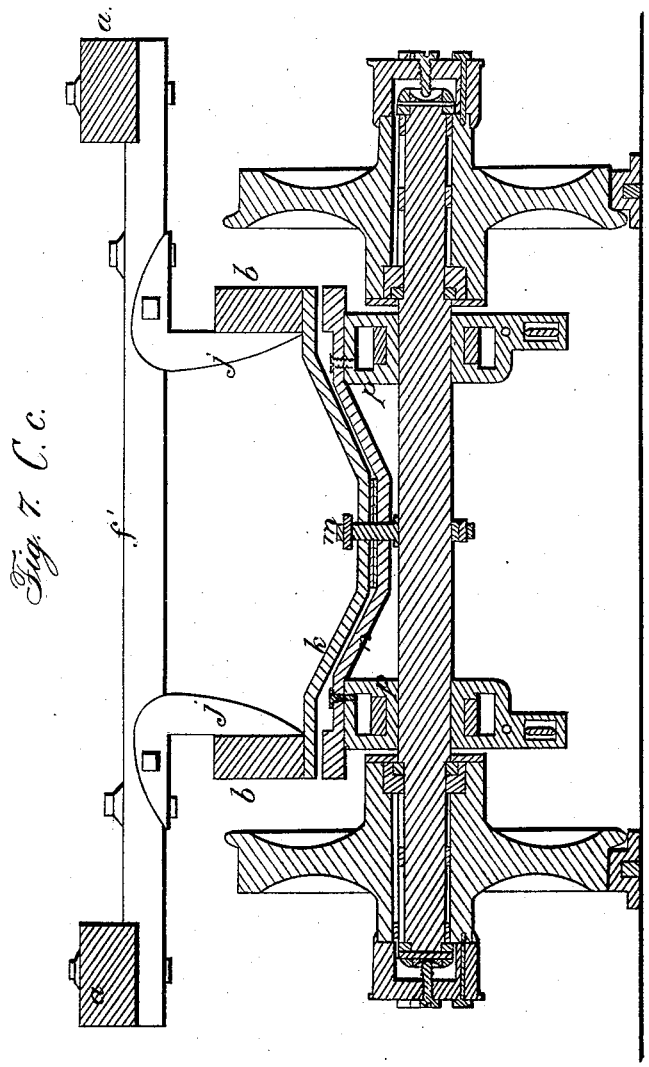
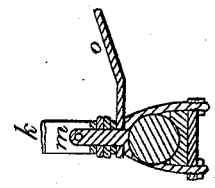
Witnesses:
A. DeLacy
Wm H Bishop
Inventor:
W Youmans,
by his attorney
W W J Kelley

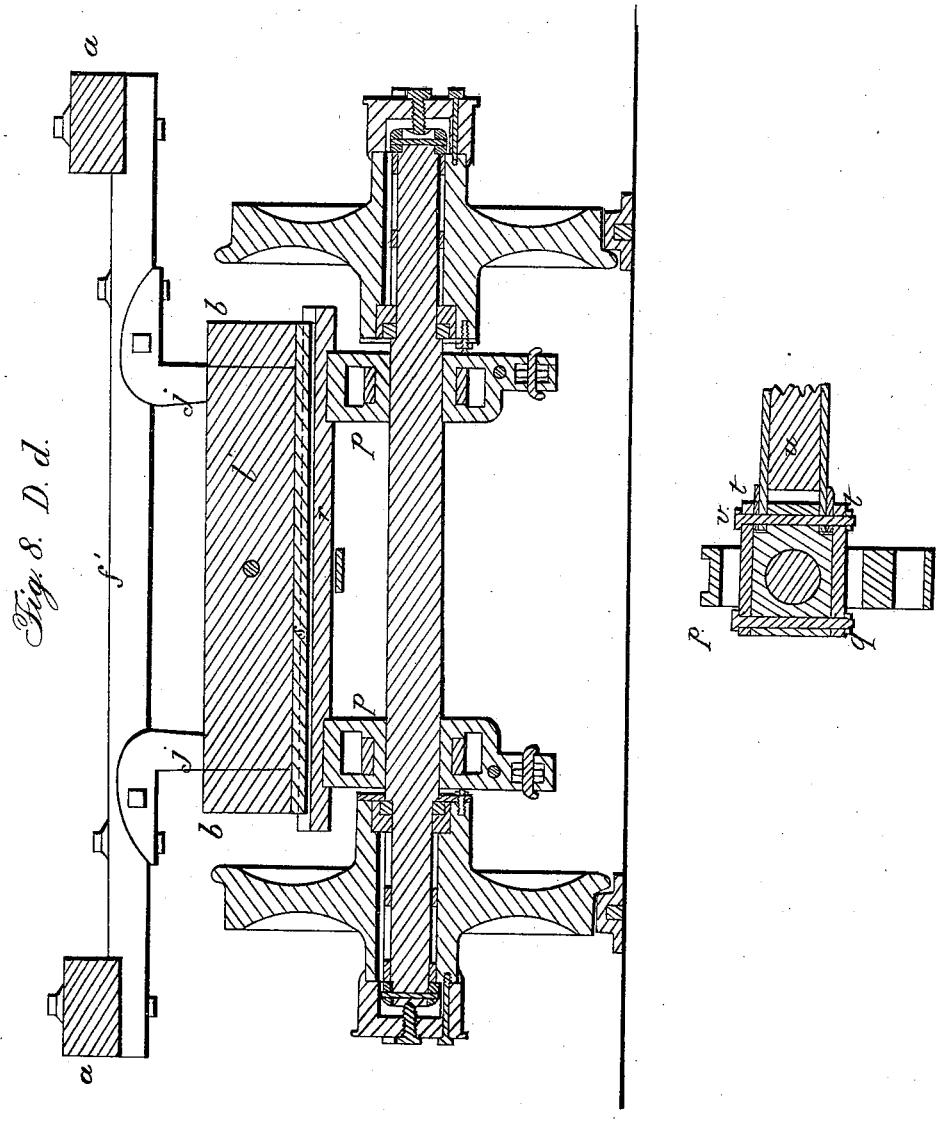

United States Patent Office.

WALTER YOUMANS, OF LANSINGBURG, NEW YORK.

Letters Patent No. 70,492, dated November 5, 1867.

---

IMPROVED CAR-TRUCK.

---

The Schedule referred to in these Letters Patent and making part of the same.

---

TO ALL TO WHOM THESE PRESENTS SHALL COME:

Be it known that I, WALTER YOUMANS, of Lansingburg, in the county of Rensselaer, and State of New York, have invented certain new and useful Improvements in Railroad Car-Trucks; and I do hereby declare that the following is a full, clear, and exact description thereof, reference being had to the accompanying drawings, making part of this specification, in which—

Figures 1 and 2 are plans of the two trucks of an eight-wheeled car, with part of the platform or floor-frame of the car body on each.

Figures 3 and 4, side elevations of the same with the wheels in outline.

Figures 5 and 6, cross-vertical sections of the same taken at the lines A $a$ and B $b$ of figs. 1 and 2.

Figures 7 and 8, cross-vertical sections taken at the lines C $c$ and D $d$ of fig. 1.

The same letters indicate like parts in all the figures.

My said invention relates to improvements on a prior invention secured to me by Letters Patent for improvements in railroad car-trucks, bearing date the 27th day of August, 1861, and numbered 2,163, by which said former invention the axles of railroad cars are enabled automatically to assume and maintain a position at right angles to the track when running on the straight parts of the track, and positions coinciding with the radii of the curves when passing into and running on curves.

And the first part of my present invention relates to an improved method of connecting the platform or body of the car with trucks, constructed on the plan of my said former invention, with the view to avoid the lateral vibrations so disagreeable to passengers, and so injurious to cars as heretofore constructed; and this part of my said invention consists in connecting the platform or body of the car with the trucks by means of vertical guides, and resting it on springs suspended from or otherwise supported by the truck-frames, so that the platform or body of the car shall be free to move up and down on the truck-frames, as the play of the springs may permit, whilst it is not permitted to move laterally or longitudinally independent of the truck-frames, which latter are not permitted to swivel under, but are at all times maintained with their sides parallel with the sides of the platform or body.

And the second part of my said invention relates to an improved method of connecting the axles in each truck, on the plan of my said former invention, with a view to obtain greater strength and durability than when constructed as described in my said former patent; and this part of my said invention consists in connecting each axle with what may be termed an under bolster by means of two-part clamping-blocks, to the upper part of each of which the ends of the bolsters are secured, whilst the two-part blocks are made to embrace and firmly clamp and hold the axle by means of vertical bolts so that it shall not turn, when this is combined with the connection of the opposite ends of the two axles in each truck, by cross-connecting rods, which are made double, and connected by hinge-bolts with the upper and with the lower parts of the two-part clamping-blocks, by means of which combination the axles while free, the one to swivel and the other to traverse under the truck-frame, are firmly held vertically under their bolsters.

In the accompanying drawings, $a$ represents the framework of the platform of a railroad car, or the part on which the body is erected, and $b$ $b$ the framework of the two trucks.

The side beams of the truck-frames are connected by two parallel cross-beams $c$ $c$, with a space between them for a purpose to be presently described. And to this part of the truck-frame are suspended elliptical (or other) springs $d$ $d$, by means of suspension rods $e$ $e$, and cross-bars, in the manner represented, or by equivalent means.

The frame $a$ of the platform is provided with the usual cross-beams $f$ $f$, sometimes termed bolsters, one near each end and over the middle of each truck, and from these are suspended cross-beams $g$ $g$, which are below the truck-frames, and which rest on the springs $d$ $d$; and these beams are connected with the bolster-beams $f$ $f$ by means of hangers $h$ $h$ $h$ $h$, and vertical bolts; the two outer ones of the said hangers being outside of the truck-frames, and the two inner ones fitted to slide freely between the two cross-beams $c$ $c$, and against or close to the inner faces of the side beams of the truck-frames. In this way the car body is made to rest on the springs, and is free to move up and down to the play of the springs, independently of the truck-frames, whilst at the same time it can neither move longitudinally nor laterally without the truck-frames.

The hangers $h$ $h$ which are nearest to the side beams of the truck-frames should have sufficient play not to bind if one side of the car body should sink lower or rise higher than the other, by reason of any difference in the load, or from any other cause.

To other cross-beams $f'$ $f'$ $f'$ $f'$ of the frame $a$ of the car body, are secured vertical guides $j$ $j$ $j$ $j$, which extend down by the side of the side beams of the truck-frames, which are thereby maintained at all times in positions parallel with the sides of the car body.

For the convenience of applying my said invention to car bodies of cars as heretofore constructed, I may use the usual car-body bolster, and swinging bolsters with centre-plate interposed, and for this purpose connect the cross-beams $g$ $g$ with the said car-body bolster by means of bolts, as represented in fig. 5, thus firmly uniting what was the swinging bolster with the body bolsters and cross-beams $g$ $g$. If the said old swinging bolsters are so short that their ends cannot serve as vertical guides in the new or altered construction, I either interpose vertical guides between the side beams of the truck-frames, or depend upon the other vertical guides $j$ $j$ $j$ $j$ to prevent the body from moving laterally without the truck-frames.

The truck-frames are each provided with two bolsters $k$ and $l$, one near each end. The centre of the bolster $k$ is connected by a king-bolt, $m$, with the centre of an under bolster, $n$, which is connected at its ends with one of the wheel-axles, in manner to be presently described. And for the purpose of more effectually bracing the parts to resist thrusts, in case of collisions, &c., the lower end of the king-bolt is made to embrace and be clamped to the middle of the wheel-axle, (see fig. 9,) and to the same end the said king-bolt passes through one end of a bifurcated brace, $o$, the other branched end of which is firmly secured to one of the cross-beams $c$ of the truck-frame. The ends of this bolster $n$ are properly secured to the upper part of two clamping-blocks $p$ $p$, the said clamping-blocks being made each in two parts, and each part formed to receive the wheel-axle, so that when the two parts are drawn together by vertical bolts $q$ $q$, they shall firmly clamp the axle. In this way the under bolster is firmly connected with the ends of the axle, so that the two can swivel together on the king-bolt as an axis, whilst at the same time the axle is firmly griped so that it shall not rotate. The wheel-axle at the other or inner end of each truck is clamped near the two wheels in like manner by two clamping-blocks $p$ $p$, such as above described, and to the top of these clamping-blocks is firmly secured a sector-plate, $r$, having a groove in its upper surface to receive the tongue of a corresponding sector-plate, $s$, secured to the under part of the bolster $l'$ of the truck-frame. In this way the wheel-axle at this end can slide under the truck-frame and car in the curve of the sector-groove. The four clamping-blocks $p$ are formed on their inner faces with projecting ears $t$, slotted to receive the ends of double cross-bars $u$ $u$, which are there connected by hinge screw-bolts $v$, that pass through the ears and the ends of the bars. Each of these double bars connects one end of the front axle with the opposite end of the rear axle, and *vice versa*, the two bars crossing each other about the middle of their length, and, to enable them to cross, the two plates constituting one bar are further apart than the two plates constituting the other double bar, so that the latter can pass and play in the open space between the two parts of the former. For the purpose of stiffening these bars, I prefer to fill up with wood the space between the two plates constituting each double bar, except for a short distance about the middle of one where the other passes through. This, however, is given merely as a matter of preference, and so with the making of each double bar of two plates, as the same kind of result can be attained by making each bar single, but spread at each end and properly formed, so that the ends can be connected with the clamping-blocks above and below the horizontal plane of the axis of the wheel-axles.

It will be borne in mind that the present invention relates, as before stated, to improvements on my former patented invention, and that the swivelling of the bolster of one wheel-axle under one end of the truck-frame, and the traversing of the other wheel-axle in the segment of a circle under the other end of the truck-frame, and the connecting of the opposite ends of the two wheel-axles by cross-bars, is not intended to be claimed herein, the principle or mode of operation of that invention being described in and secured by my said patent of August 27, 1861.

The hubs of the wheels are to be suitably formed and fitted to turn on the axles.

What I claim as my invention, and desire to secure by Letters Patent, is—

Connecting the body or platform of the car with the truck-frame or frames, substantially as described, so that the former shall be free to move up and down on the latter with springs interposed, and so that the body or platform shall not move longitudinally or laterally independently of the truck-frame or frames, when this is combined with the connection of the axles with the truck-frame, so that the said axles shall be free to move under it, substantially as described, and by the means described, or the equivalents thereof.

And I also claim connecting the ends of the under bolsters with the wheel-axles by means of clamping-blocks, substantially as described, in combination with the double cross-bars, or the equivalent thereof, connected with the clamping-blocks both above and below the horizontal plane of the axes of the wheel-axles, substantially as and for the purpose specified.

WALTER YOUMANS.

Witnesses:
J. W. LATCHER,
GEORGE STILL,
EUGENE HYATT.